United States Patent
Wang et al.

(10) Patent No.: US 9,619,429 B1
(45) Date of Patent: Apr. 11, 2017

(54) STORAGE TIERING IN CLOUD ENVIRONMENT

(71) Applicant: EMC Corporation, Hopkinton, MA (US)

(72) Inventors: Tianqing Wang, Shanghai (CN); Lintao Wan, Shanghai (CN); Feng Golfen Guo, Shanghai (CN); Qiyan Chen, Shanghai (CN); Kay Yan, Shanghai (CN); Stephen Todd, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 328 days.

(21) Appl. No.: 14/039,430

(22) Filed: Sep. 27, 2013

(51) Int. Cl.
G06F 15/167 (2006.01)
G06F 15/173 (2006.01)

(52) U.S. Cl.
CPC .............................. G06F 15/17331 (2013.01)

(58) Field of Classification Search
None
See application file for complete search history.

(56) References Cited

U.S. PATENT DOCUMENTS

| | | | | |
|---|---|---|---|---|
| 2011/0082941 A1* | 4/2011 | Kim | ..................... | H04L 12/2859 709/227 |
| 2011/0167236 A1* | 7/2011 | Orikasa | ................. | G06F 3/0608 711/165 |
| 2011/0286348 A1* | 11/2011 | Yamasaki | ............... | H04L 43/00 370/252 |
| 2013/0073702 A1* | 3/2013 | Umbehocker | ........ | G06F 9/5016 709/222 |
| 2013/0138764 A1* | 5/2013 | Satapathy | ........... | G06F 9/45558 709/214 |

(Continued)

OTHER PUBLICATIONS

Open Networking Foundation, "Software-Defined Networking (SDN) Definition," https://ww.opennetworking.org/sdn-resources/sdn-definition, Sep. 2013, 3 pages.

(Continued)

*Primary Examiner* — Kristie Shingles
*Assistant Examiner* — Mohammad Yousuf A Mian
(74) *Attorney, Agent, or Firm* — Ryan, Mason & Lewis, LLP

(57) ABSTRACT

A plurality of performance-based storage nodes and a plurality of capacity-based storage nodes of a data storage system in a network environment are allocated to one or more tiered resource pools such that the performance-based storage nodes and the capacity-based storage nodes allocated to each one of the one or more tiered resource pools are addressable via a given virtual address for each tiered resource pool. Access to the performance-based storage nodes and the capacity-based storage nodes in the one or more tiered resource pools by a plurality of compute nodes is managed transparent to the compute nodes via a given storage policy. At least portions of the compute nodes, the performance-based storage nodes, and the capacity-based storage nodes are operatively coupled via a plurality of network devices. One or more of the allocating and managing steps are automatically performed under control of at least one processing device.

19 Claims, 6 Drawing Sheets

(56) References Cited

U.S. PATENT DOCUMENTS

| | | | | |
|---|---|---|---|---|
| 2014/0019701 A1* | 1/2014 | Ohira | ................... | G06F 3/0613 |
| | | | | 711/165 |
| 2014/0173229 A1* | 6/2014 | Reohr | ................... | G06F 3/0611 |
| | | | | 711/162 |
| 2014/0237070 A1* | 8/2014 | Choi | ................... | H04L 67/1097 |
| | | | | 709/216 |
| 2014/0369209 A1* | 12/2014 | Khurshid | ............ | H04L 41/0866 |
| | | | | 370/250 |

OTHER PUBLICATIONS

Wikipedia, "OpenFlow," http://en.wikipedia.org/wiki/OpenFlow, Sep. 2013, 3 pages.

* cited by examiner

STORAGE TIERING IN CLOUD ENVIRONMENT

FIELD

The field relates generally to data storage system environments, and more particularly to techniques for storage tiering in a data storage system environment.

BACKGROUND

Storage tiering is a technique of establishing a hierarchy of different storage types whereby different types of storage can be allocated to different tiers of the hierarchy. This enables storing the appropriate data to the appropriate tier, based on service level requirements, at a minimal cost. Each tier has different levels of protection, performance, and cost. For example, high performance solid state drives (SSDs) or Fibre Channel (FC) drives can be configured as tier 1 storage to keep frequently accessed data, and low cost Serial Advanced Technology Attachment (SATA) drives as tier 2 storage to keep the less frequently accessed data. Keeping frequently used data in SSD or FC drives improves application performance. Moving less-frequently accessed data to SATA drives can free up storage capacity in high performance drives and reduce the cost of storage. This movement of data happens based on different tiering policies. The tiering policy might be based on parameters, such as file type, size, frequency of access, etc.

However, existing storage tiering methods do not typically account for network latency which can cause performance problems in the data storage system. Such problems can lead to violations of a service level agreement between a data storage service provider and its customers (tenants).

SUMMARY

Embodiments of the invention provide techniques for storage tiering in a data storage system environment.

For example, in one embodiment, a method comprises the following steps. A plurality of performance-based storage nodes and a plurality of capacity-based storage nodes of a data storage system in a network environment are allocated to one or more tiered resource pools such that the performance-based storage nodes and the capacity-based storage nodes allocated to each one of the one or more tiered resource pools are addressable via a given virtual address for each tiered resource pool. Access to the performance-based storage nodes and the capacity-based storage nodes in the one or more tiered resource pools by a plurality of compute nodes is managed transparent to the compute nodes via a given storage policy. At least portions of the compute nodes, the performance-based storage nodes, and the capacity-based storage nodes are operatively coupled via a plurality of network devices. One or more of the allocating and managing steps are automatically performed under control of at least one processing device.

In another embodiment, an article of manufacture is provided which comprises a processor-readable storage medium having encoded therein executable code of one or more software programs. The one or more software programs when executed by the at least one processing device implement steps of the above-described method.

In yet another embodiment, an apparatus comprises a memory and a processor configured to perform steps of the above-described method.

Advantageously, embodiments described herein provide storage tiering techniques that take into account network latency in a cloud or data center environment.

These and other features and advantages of the present invention will become more readily apparent from the accompanying drawings and the following detailed description.

DETAILED DESCRIPTION

Figure 1:
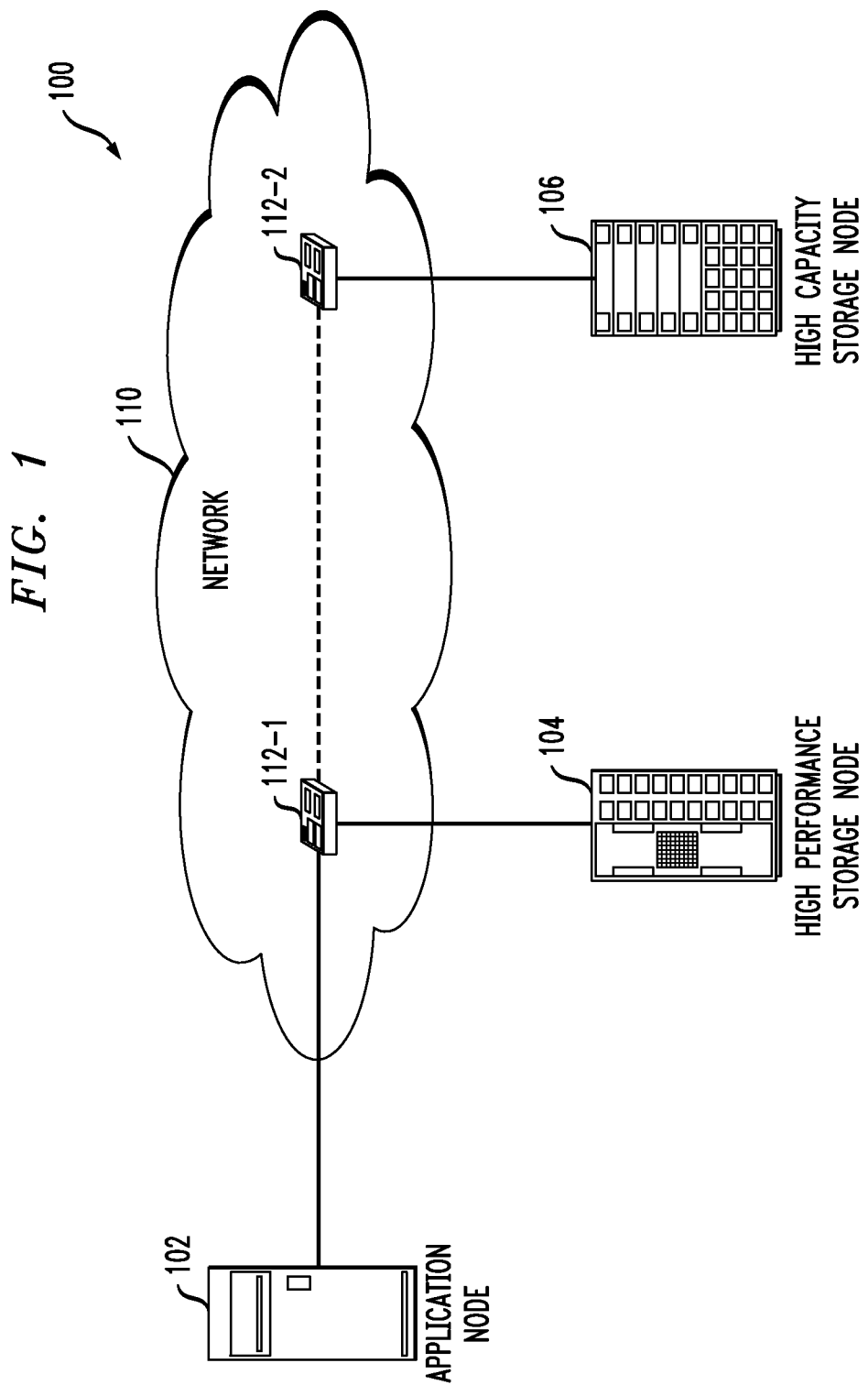
FIG. 1 shows a data storage system environment according to an embodiment of the invention.

Embodiments of the present invention will be described herein with reference to exemplary information processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "information processing system," "computing system" and "data storage system" as used herein are intended to be broadly construed, so as to encompass, for example, private or public cloud computing or storage systems, as well as other types of systems comprising distributed virtual and/or physical infrastructure. However, a given embodiment may more generally comprise any arrangement of one or more processing devices.

As used herein, the term "enterprise" refers to a business, company, firm, venture, organization, operation, concern, corporation, establishment, partnership, a group of one or more persons, or some combination thereof.

Storage tiering can be implemented as a manual or an automated process. Manual storage tiering is a traditional method where the storage administrator monitors the storage workloads periodically and moves the data between the tiers. Manual storage tiering is complex and time-consuming.

Automated storage tiering automates the storage tiering process such that data movement between the tiers is performed non-disruptively. In automated storage tiering, the application workload is proactively monitored, and active data is automatically moved to a higher performance tier and the inactive data to a higher capacity, lower performance tier. One example of automated storage tiering is the Fully Automated Storage Tiering (FAST) technology, commercially available from EMC Corporation (Hopkinton, Mass.). Data movements between various tiers can happen within (intra-array) or between (inter-array) storage arrays.

The traditional storage tiering is effective and efficient in the enterprise environment since most applications use a dedicated storage network, such as a Storage Area Network (SAN) or Network Attached Storage (NAS), to connect to the storage array directly. Applications can make full use of the bandwidth of the dedicated network. Thus, compared to the storage input/output (I/O) latency, the storage network latency can be ignored. Therefore, the network latency is not considered in the traditional storage tiering technology.

But in a cloud or data center environment, compute nodes and storage nodes are parts of resource pools and are allocated to different tenants on demand. Thus, so as to avoid occupying a resource exclusively, application (compute) nodes do not use a dedicated network to connect to storage nodes. Application nodes and storage nodes are typically connected via a converged network, and the converged network uses unified Internet Protocol (IP) centric protocols. For the storage related network traffic, Internet Small Computer System Interface (iSCSI) and Fibre Channel over Ethernet (FCoE) are frequently used as block level storage, and Network File System (NFS) and Common Internet File System (CIFS) are frequently used as file level storage. Because the network latency between application node and storage node can not be ignored in a converged network, the traditional storage tiering technology may fail to comply with a Service Level Agreement (SLA), for example, response time, because it only considers storage itself but ignores the network.

FIG. 1 shows a data storage system environment 100, according to an embodiment of the invention, and represents one approach to take network latency into consideration for storage tiering purposes. More particualrly, the approach shown in FIG. 1 is to move the storage node, especially the high performance storage node, close to the application node thereby reducing network latency.

Thus, as shown, an application node 102 is operatively connected to a high performance storage node 104 through a minimum number of switches/routers, here one switch/router 112-1 in network 110. In contrast, the application node 102 is operatively coupled to a high capacity storage node 106 through more switches/routers than high performance storage node 104, e.g., through switch/router 112-1 and 112-2. Of course, more switches/routers can be employed than what is shown in FIG. 1 so long as the high performance storage node is connected to the application node through a minimum of switches/routers.

It is to be appreciated that a high performance storage node could, for example, be a storage array with flash drives or FC drives, while a high capacity storage node could be a storage array with SATA drives. Thus, a high performance storage node is considered an example of a "performance-based storage node," and a high capacity storage node is considered an example of a "capacity-based storage node." For storage products that support inter-array storage tiering, such products could be configured on-demand by an administrator as a high performance storage node or a high capacity storage node.

This approach can reduce the network latency for the given application node and storage node. However, in a cloud environment, server virtualization is widely adopted and application instances of the tenants will be created, moved and destroyed on demand. Thus, the approach in FIG. 1 may not be effective when the tenant's application is moved to another compute node (i.e, a new location).

Moving storage nodes close to application nodes is advantageous, but a non-disruptive and automatic adaptive way is needed. In order to understand the network topology and control network devices (switches/routers), one or more embodiments of the invention leverage Software Defined Network (SDN) technology. In one embodiment, a standard protocol is used, i.e., OpenFlow, to query the topology information (for example, which node is connected to which port) and set rules (for example, routing rules) from switches and routers. OpenFlow is managed by the Open Networking Foundation (ONF), and is a standard communications interface defined between the control and forwarding layers of an SDN architecture. OpenFlow allows direct access to and manipulation of the forwarding plane of network devices such as switches and routers, both physical and virtual (hypervisor-based).

Embodiments of the invention provide an automatic approach which abstracts the storage nodes into a pool, and automatically provisions high performance storage from storage nodes close to an application node and high capacity storage from appropriate storage nodes to tiered storage pools. That is, embodiments of the invention decouple the application node and high performance storage nodes via a network abstraction whereby the allocated tiered storage pool has a virtual IP address and application nodes access the tiered storage pool via the virtual IP address. Embodiments of the invention also automatically migrate the high performance storage to a new storage node in the pool when the tenant's application moves to a new location. As will be explained in detail below, a center control plane implements these functions along with a plurality of agents, thus controlling the storage nodes and network.

This approach modifies the physical deployment in a SDN enabled data center (wherein most switches support OpenFlow protocol). The approach deploys at least a majority of the high performance storage nodes close to the application nodes, for example, at the edge switches which are the accessing switches of the application nodes or distribution switches on top of edge switches. For the high capacity storage nodes, they can be integrated into the data center as usual. All storage nodes and network devices are managed by a center control plane.

Figure 2:
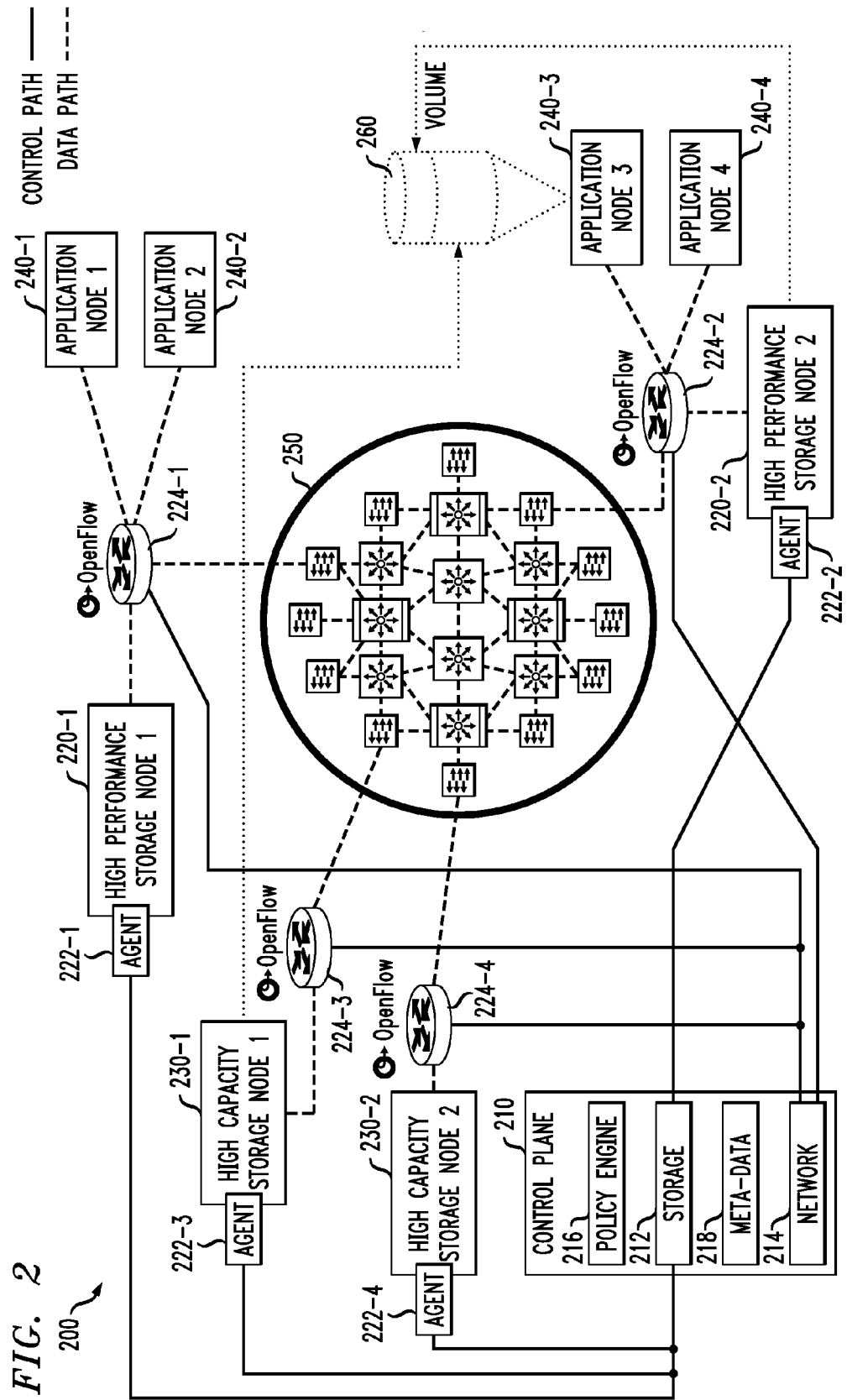
FIG. 2 shows a data storage system environment according to another embodiment of the invention.

FIG. 2 shows a data storage system environment according to an embodiment of the invention that implements this abstracting approach. The meta-data of a tiered volume can be managed by a high performance storage node, such as virtul LUN (logical unit number) mapping meta-data.

As shown in FIG. 2, the approach in data storage system environment 200 employs two major sub-systems: a center control plane 210 and a plurality of agents 222. The agents 222 are deloyed at each of the storage nodes in the data storage system. For example, as shown, agent 222-1 is deployed at high performance storage node 220-1, agent 222-2 is deployed at high performance storage node 220-2, agent 222-3 is deployed at high capacity storage node 230-1, and agent 222-4 is deployed at high capacity storage node 230-2. The storage nodes 220/230 and application nodes 240 are connected through a switch/router network 250. For example, high performance storage node 220-1, application node 240-1, and application node 240-2 are connected to network 250 via switch/router 224-1, high performance storage node 220-2, application node 240-3, and application node 240-4 are connected to network 250 via switch/router 224-2, high capcity storage node 230-1 is connected to network 250 via switch/router 224-3, and high capcity storage node 230-2 is connected to network 250 via switch/router 224-4. It is to be appreciated that the data storage system environment may have more or less storage nodes, application nodes and/or switches/routers than what is illustrated in FIG. 2.

Center control plane 210 manages all the storage nodes and network devices (e.g., switches and routers) by selecting appropriate high performance/capacity storage nodes and allocating storage for serving requests from application nodes. The center control plane 210 also transparently moves high performance storage (data) to one or more new storage locations when an application is moved to another location (i.e., from one application node to another application node). In order to avoid a single point of failure and a performance bottleneck, well-known clustering techniques can be applied to the center control plane 210.

As shown, in this embodiment, the center control plane 210 includes four main components: a storage controller 212, a network controller 214, a policy engine 216, and a meta-data repository 218.

Storage controller 212 is used to perform storage operations. Such operations can be controlled via a standard protocol, e.g., Storage Management Initiative—Specification (SMI-S) in the case of storage arrays. Main operations of the storage controller 212 include, but are not limited to, creating a volume, deleting a volume, attaching a volume, and detaching a volume. An example volume 260 is depicted in FIG. 2.

Network controller 214 employs the OpenFlow protocol to communicate with OpenFlow-supported switches directly or uses a vendor-specific Application Programming Interface (API) to communicate with a third party network controller to operate OpenFlow-supported switches indirectly. Main operations of the network controller 214 include, but are not limited to, querying the network topology and setting rules on OpenFlow switches.

Policy engine 216 selects the appropriate storage node based on predefined policies or customized policies implemented by an administrator. Selection policies are based on, for example, network topology (distance), network traffic (workloads), high performance storage node capacity usage, or combinations thereof.

Meta-data repository 218 maintains the tiered storage's virtual IP mapping relationships. Also, meta-data repository 218 maintains the tiered virtual LUN's mapping data for fault tolerance.

The agents 222 deployed in each storage node are used for the center control plane 210 to communicate with the storage nodes. If the storage node supports a standard storage management protocol such as SMI-S, the control plane could communicate with the storage node without an agent. If the storage node does not support a standard storage management protocol, an agent is employed. An agent is preferably in the form of program code or software sent to and executed by the storage node to provide the standard storage management interface, thus acting as an adapter for the storage node. Note that in FIG. 2, a control path between components is depicted as a solid line, while a data path is depicted as a solid/dotted line.

There are two use cases which illustrate advantages of embodiments of the storage tiering abstraction approach over existing storage tiering approaches. While embodiments of the invention are not limited thereto, for detailed steps of each use case, note that the deploy environment is assumed to be a slightly modified version of the one shown and described in the context of FIG. 2, namely:

A) Four application nodes (240-1 through 240-4). Application nodes 1 and 2 are connected by an OpenFlow-supported switch (224-1). Application nodes 3 and 4 are also connected by an OpenFlow-supported switch (224-2).

B) Two high performance storage nodes (220-1 and 220-2). High performance storage node 1 is connected to the same switch as application nodes 1 and 2. High performance storage node 2 is connected to the same switch as application nodes 3 and 4.

C) One high capacity storage node (230-1) connected to an OpenFlow-supported switch (224-3).

Figure 3:
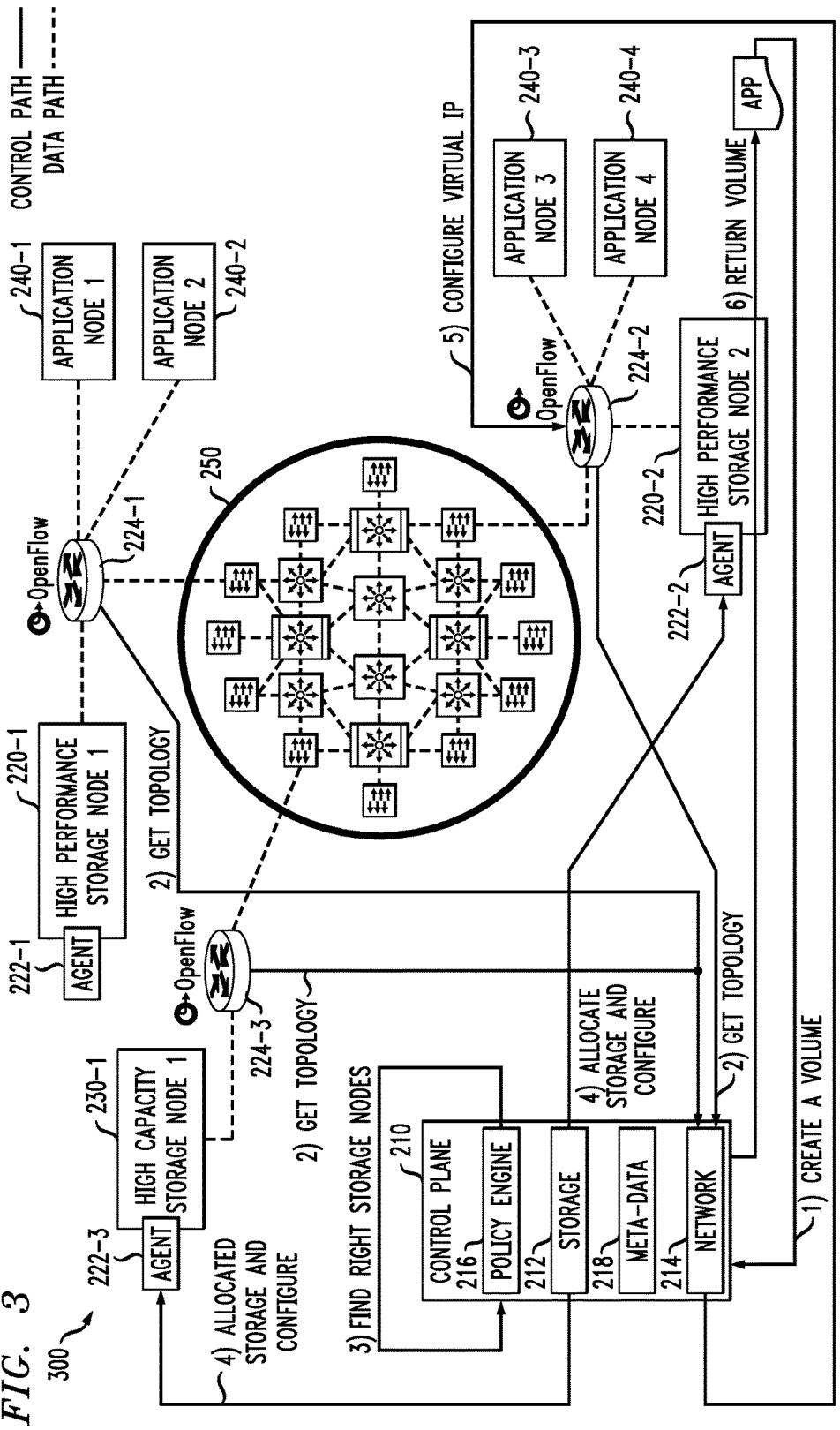
FIG. 3 shows a volume creation use case according to an embodiment of the invention.

FIG. 3 shows a volume creation use case 300 according to an embodiment of the invention.

1) An application which is located at application node 3 sends a "Create Volume" request to control plane 210 with appropriate parameters, for example, size or capacity, high performance storage percentage, etc.

2) Network controller 214 of the control plane 210 collects the network topology from the OpenFlow-supported switches. The topology information includes, for example, which application nodes and high performance storage nodes are connected to which switches. Alternatively, network topology information can be prefetched.

3) Policy engine 216 of the control plane 210 finds the appropriate high performance storage node and high capacity storage node in accordance with a given user requirement, topology information, and a pre-defined policy. Here for example, if a shortest path policy is used, high performance storage node 2 is chosen.

4) Storage controller 212 of the control plane 210 communicates with the chosen high performance storage node and high capacity storage node (via respective agents deployed thereon) to allocate proper capacity of storage on each node. Also, the high performance storage node is configured as the main node which contains the logic volume information.

5) In order to decouple the physical storage device from the application, a virtual IP address is introduced in this approach. Thus, the control plane 210 does not return the physical IP address of the high performance storage node to the application, but rather a virtual IP address. Thus, when the tenant's application moves to another application node, the high performance storage can also be moved to another high performance storage node (e.g., presumably closer to the new application node) with a different physical IP address but retains the same virtual IP address for the tenant's application to access. The network controller 214 of the control plane 210 sets two rules (described below) at the switch with which the application node and the high performance storage node are connected. Also, if the high performance storage node is not connected to the same switch to which the application node is connected, the rules are sent to the chain of the switches which connect these two nodes. Following are the two rules:

a. Rule one. This rule checks the destination of the IP header of each packet. If the destination is the virtual IP address, then modify the destination to the high performance storage node's IP address and forward to the port to which the high performance storage node is connected.

b. Rule two. This rule checks the source of the IP header of each packet. If the source is the high performance storage node, then modify the source to the virtual IP address.

6) Control plane 210 returns the volume accessing information to the application, e.g., for iSCSI, this may include the virtual IP address, IQN (iSCSI qualified name), and port. The application uses this information to access the volume.

The high performance storage node can manage the virtual LUN mapping meta-data, so that the data requests from the application route to the high performance storage node. The high performance storage node determines which data requests that it can serve, and which data requests should be forwarded to a high capacity storage node.

Figure 4:
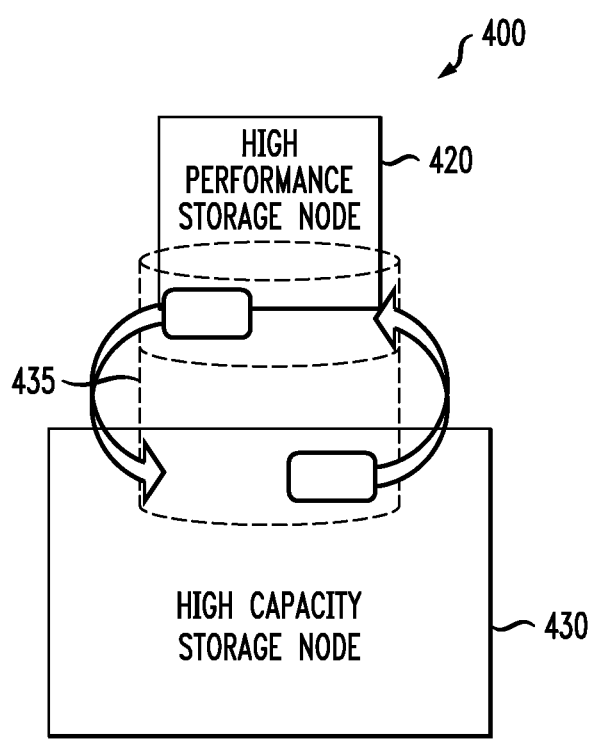
FIG. 4 shows storage tiering algorithm usage according to an embodiment of the invention.

Also, automated storage tiering technology, such as the above-mentioned FAST technology, can be applied to the virtualized volume to enable storage tiering automatically. FIG. 4 shows a storage tiering example 400 with a high performance storage node 420 and a high capacity storage node 430 utilizing an automated storage tiering algorithm (e.g., FAST) to access a virtualized volume 435.

Figure 5:
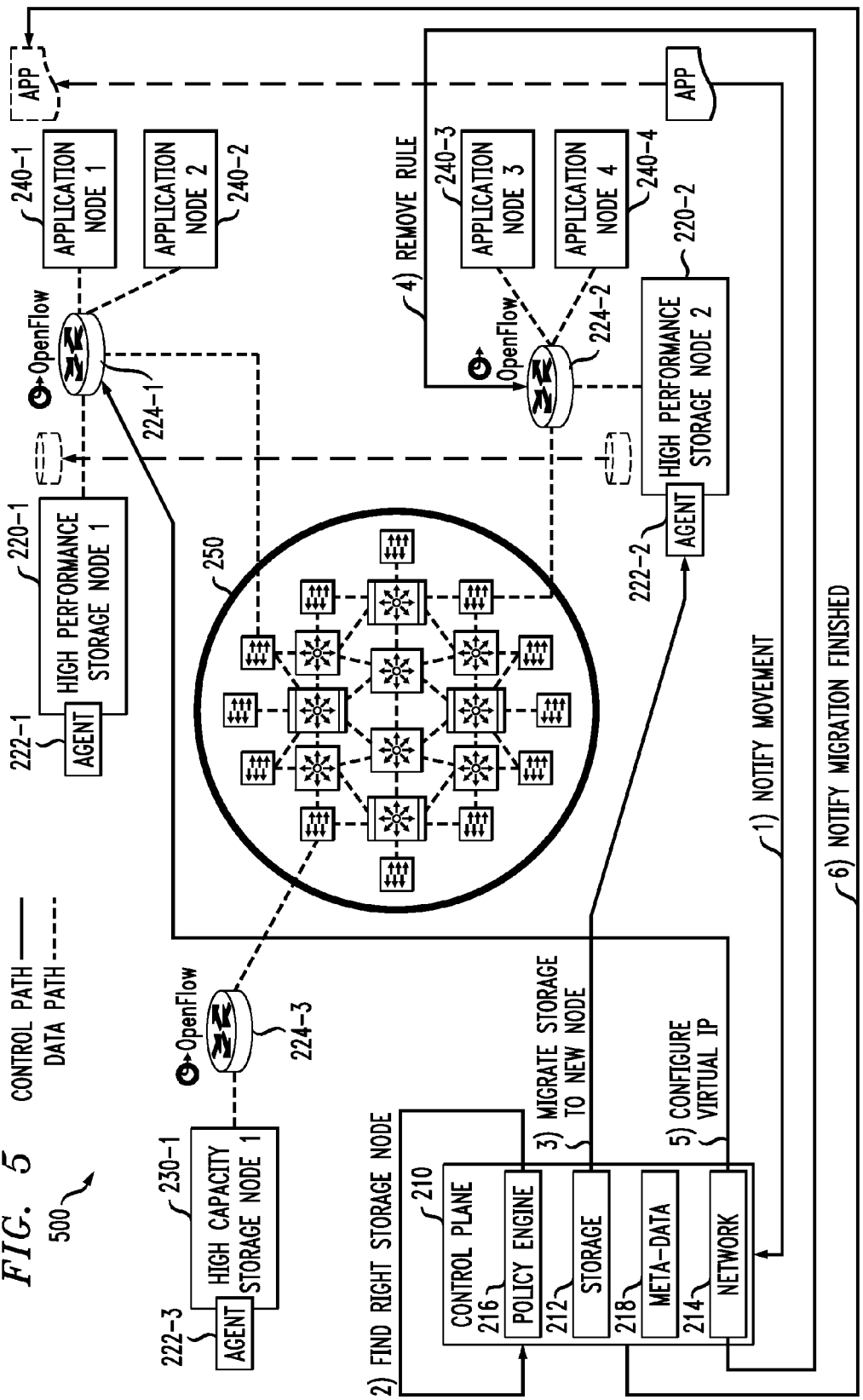
FIG. 5 shows a volume migration use case according to an embodiment of the invention.

FIG. 5 shows a volume migration use case 500 according to an embodiment of the invention.

1) Before the migration of a tenant's application to a new application node, the application or a hypervisor in a virtualized environment sends a notification to the control plane 210. The notification contains the application information, source application node information, and destination application node information.

2) The policy engine 216 of the control plane 210 finds the appropriate high performance storage node based on the notification information, topology information and a predefined policy. Here for example, if a shortest path policy is used, high performance storage node 1 is chosen.

3) The storage controller 212 of the control plane 210 notifies the source high performance storage node and the destination performance storage node to migrate the tenant's storage. Well-known, standard storage migration techniques can be applied here. Also, the new high performance storage node is configured as the main node which contains the logic volume information.

4) The network controller 214 of the control plane 210 removes the rules on the source switch or chained source switches of the original virtual IP mapping.

5) The network controller 214 of the control plane 210 sets up the virtual IP mapping rules on the switch or chained switches between the new application node and the high performance storage node.

6) When the migration is finished, the control plane 210 notifies the tenant's application or the hypervisor.

Figure 6:
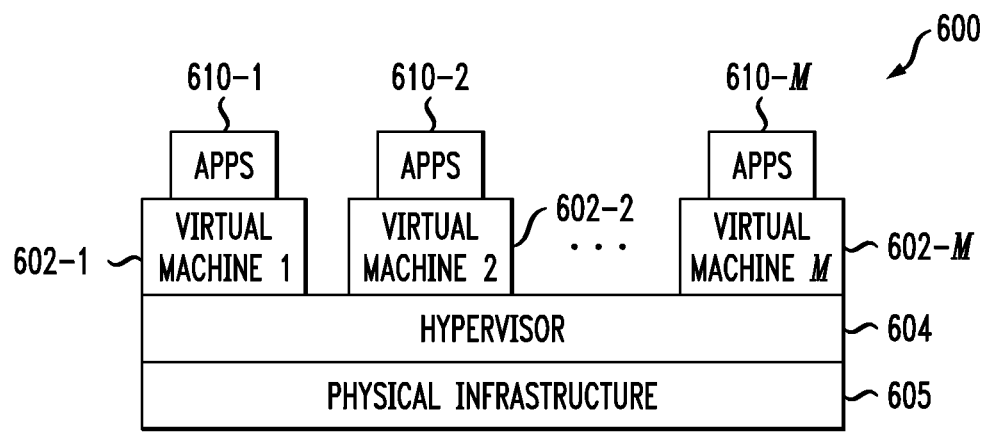
FIGS. 6 and 7 show examples of processing platforms utilized to implement a data storage system environment according to embodiments of the invention.

It is to be appreciated that the various components and steps illustrated and described in FIGS. 1 through 5 can be implemented in a distributed virtual infrastructure or cloud infrastructure. FIG. 6 illustrates a cloud infrastructure 600. The data storage system environment 200 of FIG. 2 (as well as the data storage system environment 100 of FIG. 1) can be implemented, in whole or in part, by the cloud infrastructure 600.

As shown, the cloud infrastructure 600 comprises virtual machines (VMs) 602-1, 602-2, ..., 602-M implemented using a hypervisor 604. The hypervisor 604 runs on physical infrastructure 605. The cloud infrastructure 600 further comprises sets of applications 610-1, 610-2, ..., 610-M running on respective ones of the virtual machines 602-1, 602-2, ..., 602-M (utilizing associated logical storage units or LUNs) under the control of the hypervisor 604.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Although only a single hypervisor 604 is shown in the example of FIG. 6, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 604 which, as shown in FIG. 6, is directly inserted on top of the computer hardware in order to allocate hardware resources of the physical computer (physical infrastructure 605) dynamically and transparently. The hypervisor 604 affords the ability for multiple operating systems to run concurrently on a single physical computer and share hardware resources with each other.

An example of a commercially available hypervisor platform that may be used to implement portions of the cloud infrastructure 600 in one or more embodiments of the invention is vSphere® which may have an associated virtual infrastructure management system such as vCenter®, both commercially available from VMware Inc. (Palo Alto, Calif.). The underlying physical infrastructure 605 may comprise one or more distributed processing platforms that include storage products such as VNX® and Symmetrix VMAX®, both commercially available from EMC Corporation (Hopkinton, Mass.). A variety of other storage products may be utilized to implement at least a portion of the cloud infrastructure 600.

Figure 7:
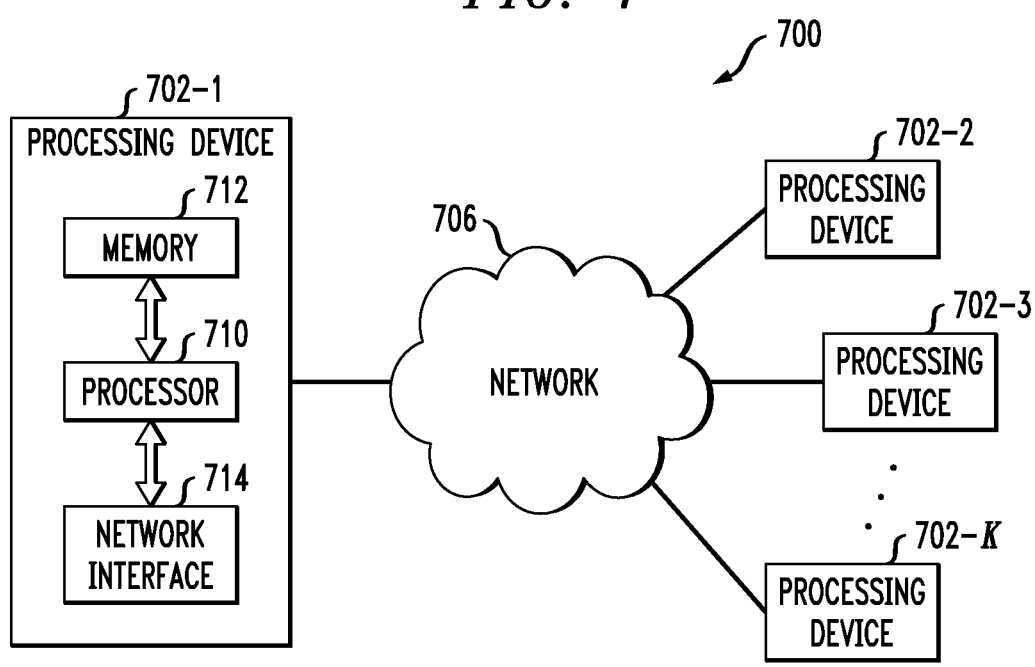

An example of a processing platform on which the cloud infrastructure 600 may be implemented is processing platform 700 shown in FIG. 7. The processing platform 700 in this embodiment comprises a plurality of processing devices denoted 702-1, 702-2, 702-3, ..., 702-K which communicate with one another over a network 706. One or more of the components shown and described in FIGS. 1 through 5 may therefore each run on one or more storage arrays, one or more hosts, servers, computers or other processing platform elements, each of which may be viewed as an example of what is more generally referred to herein as a "processing device." As illustrated in FIG. 7, such a device generally comprises at least one processor and an associated memory, and implements one or more functional modules for controlling certain features of components shown in FIGS. 1 through 5. Again, multiple elements or modules may be implemented by a single processing device in a given embodiment.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements.

The memory 712 (or other storage devices) having program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals. Furthermore, memory 212 may comprise electronic memory such as random access memory (RAM), read-only memory (ROM) or other types of memory, in any combination. One or more software programs (program code) when executed by a processing device such as the processing device 702-1 causes the device to perform functions associated with one or more of the elements/components of system environment 200. One skilled in the art would be readily able to implement such software given the teachings provided herein. Other examples of processor-readable storage media embodying embodiments of the invention may include, for example, optical or magnetic disks.

Also included in the processing device 702-1 is network interface circuitry 714, which is used to interface the processing device with the network 706 and other system components. Such circuitry may comprise conventional transceivers of a type well known in the art.

The other processing devices 702 of the processing platform 700 are assumed to be configured in a manner similar to that shown for processing device 702-1 in the figure.

The processing platform 700 shown in FIG. 7 may comprise additional known components such as batch processing systems, parallel processing systems, physical machines, virtual machines, virtual switches, storage volumes, logical units, etc. Again, the particular processing platform shown in FIG. 7 is presented by way of example only, and components and steps shown and described in FIGS. 1 through 5 may include additional or alternative processing platforms, as well as numerous distinct processing platforms in any combination.

Also, numerous other arrangements of servers, computers, storage devices or other components are possible for implementing components shown and described in FIGS. 1 through 5. Such components can communicate with other components over any type of network, such as a wide area network (WAN), a local area network (LAN), a satellite network, a telephone or cable network, a storage network (e.g., Fibre Channel, iSCSI, Ethernet), a converged network (e.g., FCoE or Infiniband) or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   allocating a plurality of performance-based storage nodes and a plurality of capacity-based storage nodes of a data storage system in a network environment to one or more tiered resource pools such that, for a given pool of the one or more tiered resource pools, the performance-based storage nodes and the capacity-based storage nodes allocated to the given pool are addressable via a given virtual address assigned to the given pool; and
   managing access of the performance-based storage nodes and the capacity-based storage nodes in the one or more tiered resource pools by a plurality of compute nodes, wherein access to the performance-based storage nodes and the capacity-based storage nodes is managed transparent to the compute nodes via a given storage policy;
   wherein at least portions of the compute nodes, the performance-based storage nodes, and the capacity-based storage nodes are operatively coupled via a plurality of network devices;
   wherein the managing step further comprises at least one of creating and migrating a storage volume in response to a request from one of the plurality of compute nodes;
   wherein creating the storage volume further comprises:
      collecting network topology information from the plurality of network devices, and selecting an appropriate one of the performance-based storage nodes and the capacity-based storage nodes based at least in part on the given storage policy and the network topology information;
      communicating with the selected appropriate one of the performance-based storage nodes and the capacity-based storage nodes to allocate storage capacity thereon; and
      sending, to the compute node that requested creation of the storage volume, the given virtual address of the tiered resource pool in which the selected appropriate one of the performance-based storage nodes and the capacity-based storage nodes is allocated; and
   wherein one or more of the allocating and managing steps are automatically performed under control of at least one processing device.

2. The method of claim 1, wherein the given storage policy comprises a shortest path policy.

3. The method of claim 1, wherein the step of creating a storage volume further comprises instructing the one or more network devices that connects the compute node that requested creation of the storage volume and the selected appropriate one of the performance-based storage nodes and the capacity-based storage nodes to apply a packet-forwarding rule set.

4. The method of claim 3, wherein the packet-forwarding rule set, for a given one of the network devices, specifies to check the destination of a header of each packet that the network device receives and, when the destination is the given virtual address, modify the destination to the physical address of the selected appropriate one of the performance-based storage nodes and the capacity-based storage nodes and forward the modified packet.

5. The method of claim 4, wherein the packet-forwarding rule set, for a given one of the network devices, specifies to check the source of a header of each packet that the network device receives and, when the source is the physical address of the selected appropriate one of the performance-based storage nodes and the capacity-based storage nodes, modify the source to the given virtual address and forward the modified packet.

6. The method of claim 1, wherein the step of migrating a storage volume further comprises receiving a notification from one of the compute nodes that an application executing thereon is to be moved to another one of the compute nodes for execution, and the storage volume to be migrated is associated with the application to be moved.

7. The method of claim 6, wherein the step of migrating a storage volume further comprises selecting an appropriate one of the performance-based storage nodes and the capacity-based storage nodes to which to migrate the storage volume based at least in part on the given storage policy, the network topology information, and the location of the other compute node receiving the application.

8. The method of claim 7, wherein the given storage policy comprises a shortest path policy.

9. The method of claim 8, wherein the step of migrating a storage volume further comprises notifying the source one of the performance-based storage nodes and the capacity-based storage nodes to migrate the storage volume to the selected appropriate destination one of the performance-based storage nodes and the capacity-based storage nodes.

10. The method of claim 9, wherein the step of migrating a storage volume further comprises instructing the one or more network devices that connects the compute node receiving the application and the selected appropriate destination one of the performance-based storage nodes and the capacity-based storage nodes to apply a packet-forwarding rule set.

11. The method of claim 10, wherein the step of migrating a storage volume further comprises instructing the one or more network devices that connects the compute node originally executing the application and the source one of the performance-based storage nodes and the capacity-based storage nodes to remove a packet-forwarding rule set.

12. An article of manufacture comprising a processor-readable storage medium having encoded therein executable code of one or more software programs, wherein the one or more software programs when executed by the at least one processing device implement the steps of:
   allocating a plurality of performance-based storage nodes and a plurality of capacity-based storage nodes of a data storage system in a network environment to one or more tiered resource pools such that, for a given pool of the one or more tiered resource pools, the performance-based storage nodes and the capacity-based storage nodes allocated to the given pool are addressable via a given virtual address assigned to the given pool; and
   managing access of the performance-based storage nodes and the capacity-based storage nodes in the one or more tiered resource pools by a plurality of compute nodes, wherein access to the performance-based storage nodes and the capacity-based storage nodes is managed transparent to the compute nodes via a given storage policy;
   wherein the managing step further comprises at least one of creating and migrating a storage volume in response to a request from one of the plurality of compute nodes;
   wherein creating the storage volume further comprises:
      collecting network topology information from the plurality of network devices, and selecting an appropriate one of the performance-based storage nodes and the capacity-based storage nodes based at least in part on the given storage policy and the network topology information;
      communicating with the selected appropriate one of the performance-based storage nodes and the capacity-based storage nodes to allocate storage capacity thereon; and
      sending, to the compute node that requested creation of the storage volume, the given virtual address of the tiered resource pool in which the selected appropriate one of the performance-based storage nodes and the capacity-based storage nodes is allocated; and
   wherein at least portions of the compute nodes, the performance-based storage nodes, and the capacity-based storage nodes are operatively coupled via a plurality of network devices.

13. An apparatus, comprising:
   a memory; and
   at least one processor operatively coupled to the memory and configured to control a central control plane, wherein the central control plane is configured to:
   allocate a plurality of performance-based storage nodes and a plurality of capacity-based storage nodes of a data storage system in a network environment to one or more tiered resource pools such that, for a given pool of the one or more tiered resource pools, the performance-based storage nodes and the capacity-based storage nodes allocated to the given pool are addressable via a given virtual address assigned to the given pool; and manage access of the performance-based storage nodes and the capacity-based storage nodes in the one or more tiered resource pools by a plurality of compute nodes, wherein access to the performance-based storage nodes and the capacity-based storage nodes is managed transparent to the compute nodes via a given storage policy, wherein the management comprises at least one of creation and migration of a storage volume in response to a request from one of the plurality of compute nodes, wherein the creation of the storage volume further comprises collection of network topology information from the plurality of network devices, selection of an appropriate one of the performance-based storage nodes and the capacity-based storage nodes based at least in part on the given storage policy and the network topology information, communication with the selected appropriate one of the performance-based storage nodes and the capacity-based storage nodes to allocate storage capacity thereon, and sending, to the compute node that requested creation of the storage volume, the given virtual address of the tiered resource pool in which the selected appropriate one of the performance-based storage nodes and the capacity-based storage nodes is allocated, and wherein at least portions of the compute nodes, the performance-based storage nodes, and the capacity-based storage nodes are operatively coupled via a plurality of network devices.

14. The apparatus of claim 13, wherein the plurality of performance-based storage nodes and a plurality of capacity-based storage nodes each comprise an agent for communicating with the central control plane.

15. The method of claim 1, wherein the network topology information comprises information associated with respective connections among the performance-based storage nodes and the capacity-based storage nodes to one or more switches.

16. The article of manufacture of claim 12, wherein migrating the storage volume further comprises:
   receiving a notification from one of the compute nodes that an application executing thereon is to be moved to another one of the compute nodes for execution, and the storage volume to be migrated is associated with the application to be moved; and
   selecting an appropriate one of the performance-based storage nodes and the capacity-based storage nodes to which to migrate the storage volume based at least in part on the given storage policy, the network topology information, and the location of the other compute node receiving the application;
   wherein the given storage policy comprises a shortest path policy.

17. The apparatus of claim 13, wherein the migration of the storage volume further comprises:

receipt of a notification from one of the compute nodes that an application executing thereon is to be moved to another one of the compute nodes for execution, and the storage volume to be migrated is associated with the application to be moved; and selection of an appropriate one of the performance-based storage nodes and the capacity-based storage nodes to which to migrate the storage volume based at least in part on the given storage policy, the network topology information, and the location of the other compute node receiving the application;

wherein the given storage policy comprises a shortest path policy.

18. The method of claim 1, wherein the performance-based storage nodes comprise at least one high performance storage node.

19. The method of claim 1, wherein the capacity-based storage nodes comprise at least one high capacity storage node.

* * * * *